United States Patent

[11] 3,616,413

| [72] | Inventor | Philip Reichner<br>Pittsburgh, Pa. |
|---|---|---|
| [21] | Appl. No. | 765,834 |
| [22] | Filed | Oct. 8, 1968 |
| [45] | Patented | Oct. 26, 1971 |
| [73] | Assignee | Westinghouse Electric Corporation<br>Pittsburgh, Pa. |

[54] SOLID ELECTROLYTE OXYGEN SENSOR
1 Claim, 6 Drawing Figs.

| [52] | U.S. Cl. | 204/195 |
|---|---|---|
| [51] | Int. Cl. | G01n 27/46 |
| [50] | Field of Search | 204/1, 195;<br>136/86, 86 A–86 E |

[56] References Cited
UNITED STATES PATENTS

| 3,514,377 | 5/1970 | Spacil et al. | 204/195 |
|---|---|---|---|
| 3,347,767 | 10/1967 | Hickam | 204/195 |
| 3,442,773 | 5/1969 | Wilson | 204/195 |

FOREIGN PATENTS

| 37,801 | 6/1962 | Germany | |

*Primary Examiner*—T. Jung
*Attorneys*—F. H. Henson and C. F. Renz

ABSTRACT: The invention relates to a solid electrolyte oxygen sensor comprising a solid electrolyte operating at an elevated temperature which measures the difference in concentration of oxygen on either side of the solid electrolyte layer in contact with two electrodes to generate an open circuit voltage. The sensor is enclosed within a sealed container. The cell is a symmetrical structure consisting of a platelike electrolyte with electrodes positioned on a portion of the surfaces and with two cell halves of a suitable material covering the solid electrolyte member and guiding the gas flow over the electrodes to permit two similar flow paths to join at the edge of the electrolyte plate.

PATENTED OCT 26 1971 3,616,413
SHEET 1 OF 3
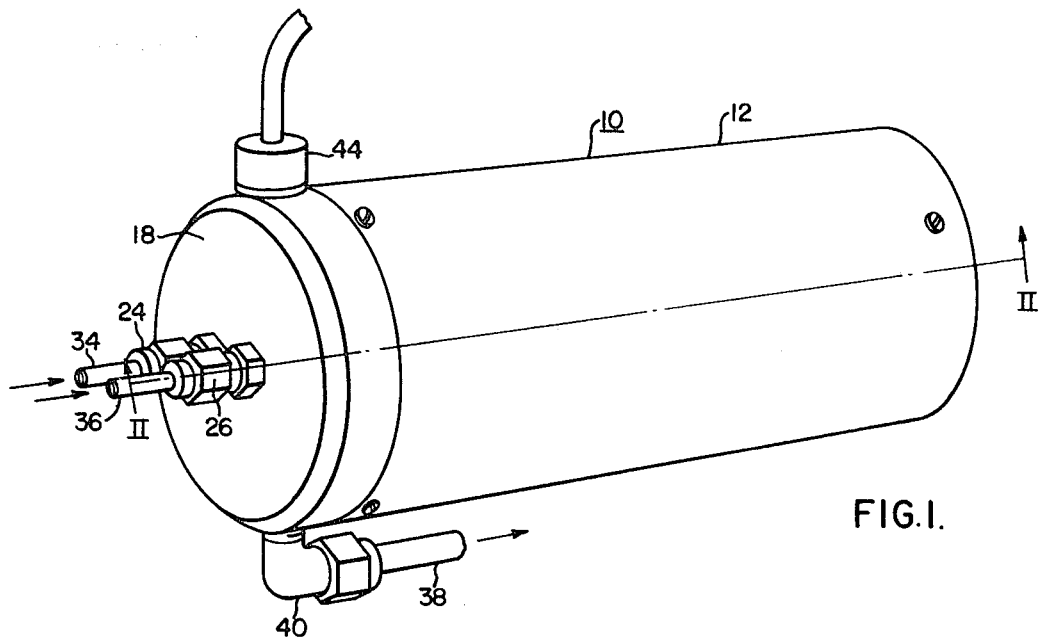
FIG.1.
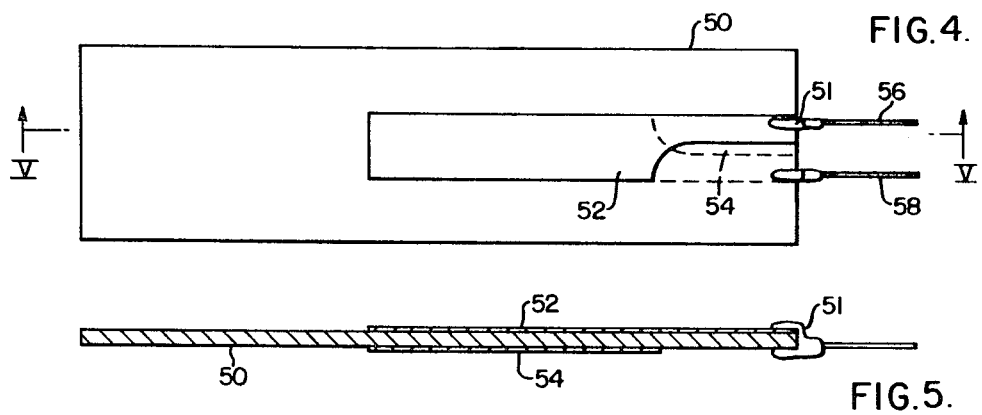
FIG.4.
FIG.5.
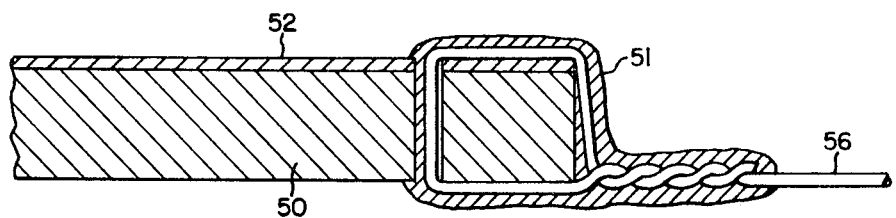
FIG.6.
WITNESSES
Theodore F. Wiehel
James T. Young
INVENTOR
Philip Reichner
BY Charles F. Renz
ATTORNEY

SOLID ELECTROLYTE OXYGEN SENSOR

BACKGROUND OF THE INVENTION

This invention relates to an oxygen sensor device which utilizes a high temperature solid electrolyte as the sensing element or cell. The solid electrolyte material may be of the type described in U.S. Pat. No. 3,400,054 by R. Ruka et al. U.S. Pat. No. 3,347,767 by W. Hickam describes a specific structure of an oxygen gauge utilizing the solid electrolyte materials. In addition, copending application Ser. No. 514,871 by W. Hickam filed Dec. 20, 1966 and assigned to the same assignee, now U.S. Pat. No. 3,494,836, is directed to a further modification and application of solid-state oxygen sensor devices.

Although these devices provide accurate instruments, some problem areas became apparent particularly when the devices were adapted for dynamic measurements in medical applications. It was found that the oxygen sensors were sensitive to gas flow rate due to temperature gradients and pressure changes. The sensor output is sensitive to total pressure fluctuations of the reference gas. The prior design was fragile and sealing of the device was of a critical nature.

SUMMARY OF THE INVENTION

Briefly, the present invention is a new and improved structure for a solid electrolyte oxygen sensor device. The structure consists of a symmetrical cell that is formed by a platelike electrolyte in which the electrodes are provided on the two opposite surfaces. This platelike electrolyte is sandwiched between two cell halves that cover the electrolyte and guide the gas flow over the electrodes. The structure of the two cell halves allow two similar flow paths to join at an edge of the plate electrolyte. This structure results in the cell that is insensitive to gas flow rate and ambient pressure.

The oxygen sensor cell is also sealed within a chamber to permit the outer surface of the chamber to be a relatively low temperature in comparison with the high-operating temperature of the oxygen sensor cell positioned within the chamber.

BRIEF DESCRIPTION OF THE DRAWINGS

Further advantages and uses of the invention will become more apparent when considered in view of the following detailed description and drawings, in which:

FIG. 1 is a perspective view of an oxygen sensor device in accordance with the teachings of the invention;

FIG. 4 is an elevational view of the solid electrolyte plate member with associated electrodes and lead-wires as shown in FIG. 3;

FIG. 5 is a sectional view taken along line V—V of FIG. 4;

FIG. 6 is an enlarged sectional view of a portion of FIG. 5 illustrating the connection of the electrode to a lead-wire member.

DESCRIPTION OF THE PREFERRED EMBODIMENTS

Figure 2:
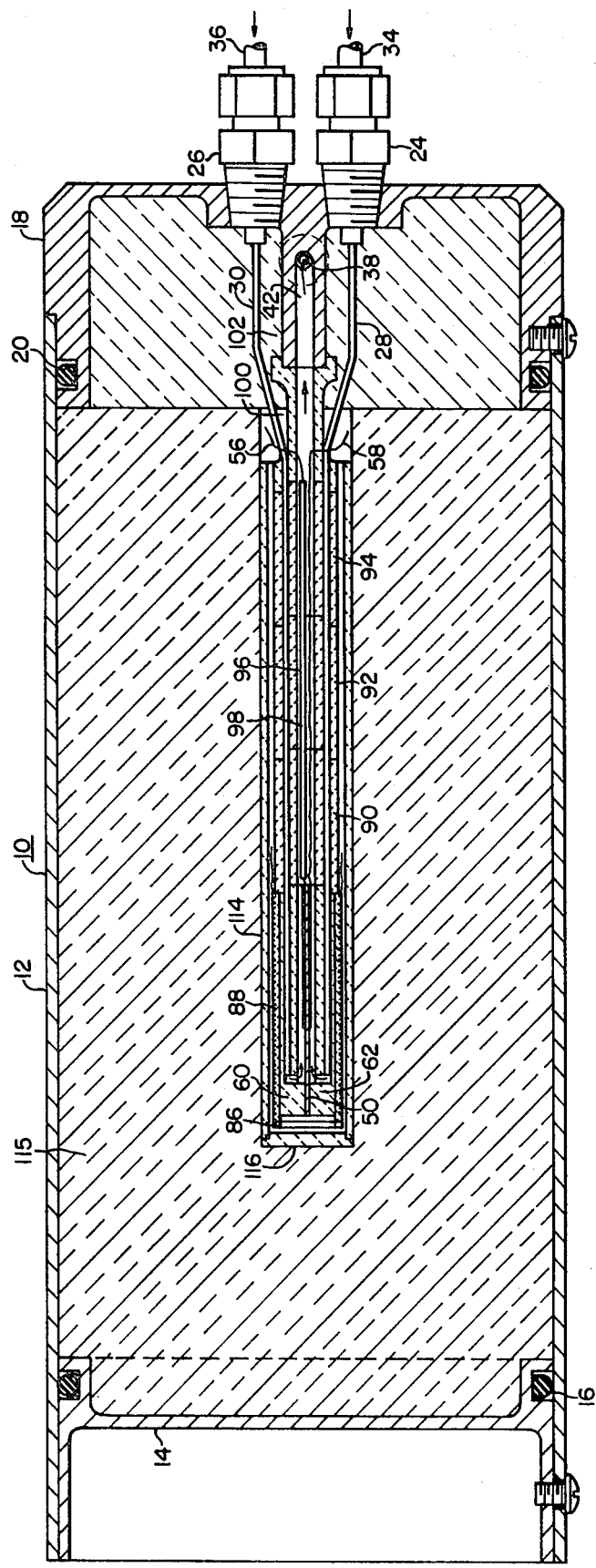
FIG. 2 is a sectional view taken along line II—II of FIG. 1.
Figure 3:
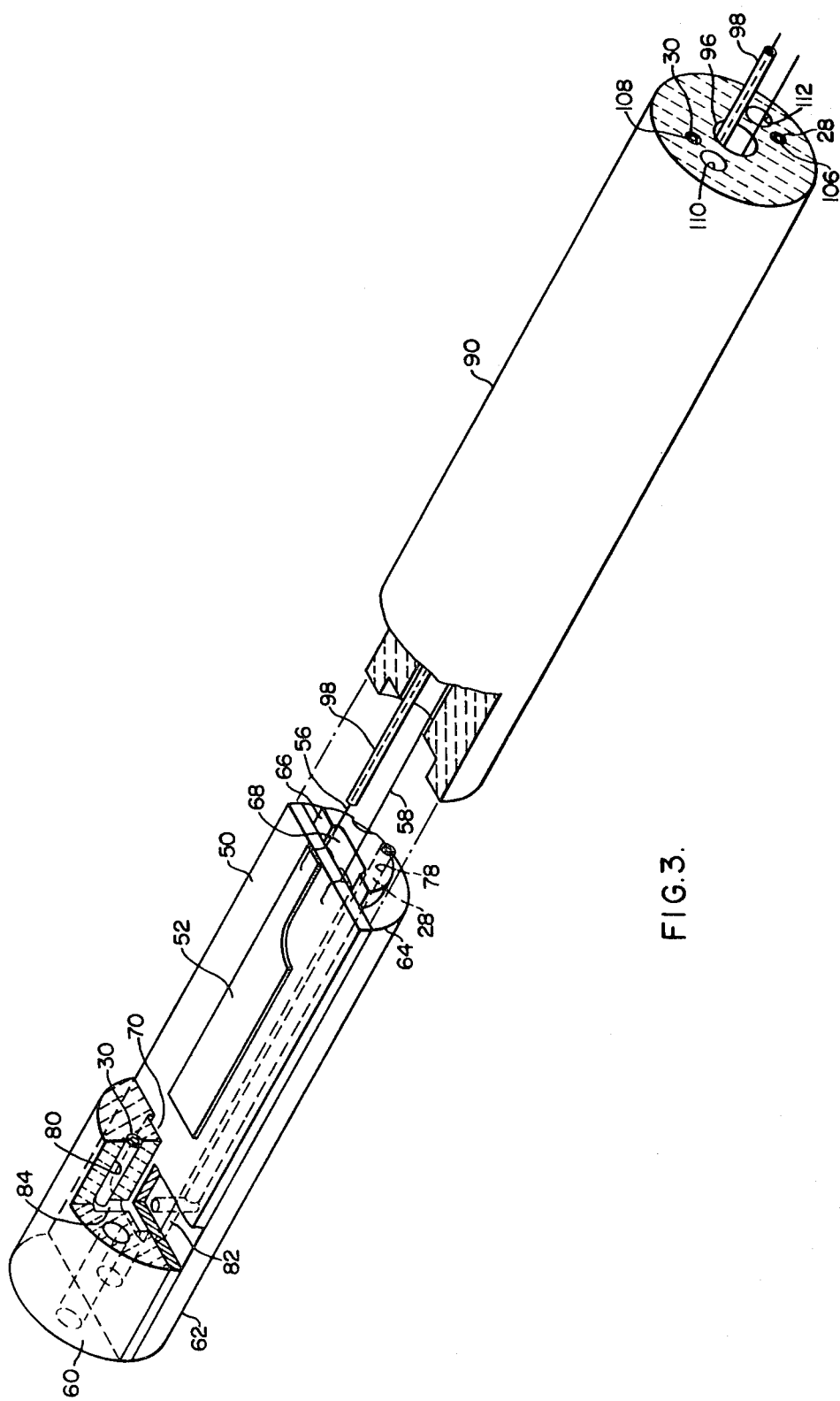
FIG. 3 is an exploded perspective view partly in section of the oxygen sensor cell as shown in FIG. 2.

Referring now to the drawings and particularly to FIGS. 1, 2 and 3 an oxygen sensor assembly is illustrated. The sensor consists of an outer casing 10 which comprises a tubular envelope portion 12 of a suitable material such as aluminum with a back-end plate 14 inserted into the envelope portion 12 and closing off one end of the envelope portion 12. The backplate member is provided with an O-ring member 16 to provide a hermetic seal between the envelope 12 and the backplate 14. The other end of the envelope 12 is also closed off by a front end plate 18 which is also provided with an O-ring seal means 20 for hermetically sealing the outer casing 10. Fittings 24 and 26 are provided in the front plate 18 to provide entry of inlet gas lines 34 and 36 into the housing 10. The inlet tubulations 34 and 36 connect to platinum tubing 28 and 30 respectively. The inside diameter of the tubing 28 and 30 may be of about 0.021 inch.

An exhaust tubulation 38 is also connected to a suitable fitting 40 through the sidewall of the end plate member 18. The exhaust tubulation 38 extends through the wall of the casing 10 to a central exhaust duct 42. An electrical connector 44 is also provided on the outer wall of the casing 10 for connection of electrical power for heating the oxygen sensor and also for deriving electrical power from the electrolytic cell of the oxygen sensor.

A solid electrolyte plate 50 illustrated in FIG. 4 is of a suitable material such as described in the previously mentioned U.S. Pat. No. 3,400,054 and may be of a material such as zirconium dioxide stabilized with calcium oxide. The plate electrolyte is provided with two electrodes 52 and 54. The electrodes 52 and 54 are of platinum. The electrodes 52 and 54 are connected respectively to lead-wire members 56 and 58 as illustrated in detail in FIGS. 5 and 6. The electrode-leads 56 and 58 consist of 0.008 inch diameter platinum wire which passes through an aperture in the plate electrolyte 50 and are twisted tightly in place. Platinum paste is painted over this aperture prior to insertion of a wire lead 56 and after the twisting operation a second coating of platinum paste is provided over the lead to form a coating 51 to insure a good electrical conductive contact between the lead 56 and the electrode 52. A similar construction is provided with respect to the connection of the lead 58 to the electrode 54.

The electrolyte plate 50 is sandwiched between two cell halves 60 and 62 as illustrated in FIG. 3. The cell halves 60 and 62 are of a suitable electrically resistive and high temperature material such as lava. The cell halves 60 and 62 are normally machined and formed and then baked prior to assembly. The cell halves 60 and 62 are similar in structure and as illustrated in FIG. 3 have an outer cylindrical surface 64 and a planar inner surface 66. A shallow groove 68 is provided in the planar surface 66 and provides the flow passage for gas over the electrode 54 while a similar shallow groove 70 in the cell-half 60 provides a flow path over the electrode 52. A longitudinal opening 78 is provided in the cell-half 62 and the tubulation 28 extends within this opening for conducting the inlet air up to a small passage 82 transversed to a longitudinal axis which conducts the inlet gas from the opening 78 to the groove path or channel 68. A similar opening 80 is provided in the upper portion of cell-half 60 through which the tubulation 30 passes and a similar transverse opening 84 conducts the inlet gas into the groove path 70 and over the electrode 52.

A tubular member 86 surrounds the assembled cell halves and electrolyte plate 50 as illustrated in FIG. 2 and FIG. 1. The member 86 may be also of a similar material as that used in the cell halves 60 and 62 and a heater winding 88 is provided thereon for applying the necessary heat to the oxygen sensor. The normal operating temperature is about 850° C.

As illustrated in FIG. 2 three thimbles 90, 92 and 94 similar in construction are provided for supporting the oxygen sensor cell. These thimbles are fitted together as illustrated and consist of a central tubulation 96 through which air is exhausted into the exhaust tubulation 42 and 38. The thimbles 90, 92 and 94 may be bonded together whereas the thimble 90 is normally simply fitted to the cell halves 60 and 62. The leads 56 and 58 extend through this central passage 96 as indicated in FIG. 2 and an insulating sleeve 98 may be provided about the lead 56. The thimble 94 is seated on an intermediate thimble 100 which is in turn seated on an extension 102 of the end face 18. The leads 56 and 58 may pass through an opening in the thimble 100 and are connected to the electrical terminal 44. The thimbles 90, 92 and 94 also contain apertures 106 and 108 through which the inlet tubulation 28 and 30 pass. The other longitudinal passages 110 and 112 may be utilized for providing temperature monitors near the oxygen sensor cell. A sleeve member 114 also of similar material as the cell halves 60 and 62 may surround the entire assembly of the cell halves and thimbles with a top cap 116. Insulating material 115 such as surrounds the sleeve 114 and fills the plenum 115 between the sleeve 114 and the container 10.

The points of passage of the lead-wires 56 and 58 through the intermediate thimble 100 also provide an exhaust passage for the gases in the insulation 115 and in the annulus between the sleeve member 114 and the sensor cell. In this manner, leakage from the cell channels 68 and 70 is drawn off and will not affect the cell reading.

In the operation of the device, the heater element 88 is supplied with suitable (power of about 20 watts) so that the tube will operate at a temperature of about 850° C. Room air or another known reference gas is made available to one of the inlets 34 or 36. Either fitting may be used, although interchanging the reference and sampling size will reverse the polarity of the cell output. It may also be desirable to place the room air through a drying agent for improved accuracy. This reference pressure of room air is about 20.99 percent oxygen. The other inlet may be utilized to monitor an individual breathing or to evaluate an unknown gas and is referred to as the sampling gas inlet and of course will pass across one electrode 52 or 54 while the reference gas will pass across the other electrode 52 or 54. An exhaust system is connected to the exhaust tubulation 38 at a vacuum pressure of about 200 mm. Hg so as to insure uniform flow of both the reference and the sampling gas across their respective electrodes. The lead-wire members to the electrodes are connected to a gauge which measures the voltage developed across the cell. The cell output voltage is proportional to the logarythm of TB/TA where TA is a partial pressure of oxygen in one electrode and TB is a partial pressure of oxygen at the other. The voltage is generated by the transfer of the oxygen ions within the solid electrolyte resulting in a cell that is sensitive only to oxygen. In the above manner, an indication of the amount of oxygen in the sampling gas introduced into the inlet is registered by the gauge. It is also obvious that the structure lends itself to a plurality of separate cells within one unit. The separate cells can be operated and connected independently or connected in series for additional output. In addition, a plurality of electrodes may be utilized in series to obtain a higher signal to noise ratio.

Since numerous changes may be made in the above described apparatus different embodiments of the invention may be made without departing from the spirit thereof, it is intended that all matter contained in the foregoing description or shown in the accompanying drawings, shall be interpreted as illustrative and not in a limiting sense.

I claim:

1. An oxygen analyzer comprising, a housing having a cavity therein, a solid electrolyte electrochemical cell assembly positioned within said cavity to form an annulus about said cell assembly, said solid electrolyte electrochemical cell assembly including, a flat plate solid, electrolyte material exhibiting oxygen ion conductivity, a first and second electrically conductive electrode disposed on opposite surfaces of said flat plate solid electrolyte, first and second symmetrical cell sections, each of said cell sections having a similar groove defined on one surface, said flat plate solid electrolyte being secured between said first and second symmetrical cell sections with said first and second electrodes being contained within the grooves of said first and second cell sections respectively, the surface of said grooves and said solid electrolyte forming a first and second open ended gas passage through said cell assembly, first and second inlet tubing means having substantially identical gas passages operatively connected to one end of said first and second gas passages respectively for supplying a sample gas of unknown oxygen concentration across said first electrode and a reference gas of known oxygen concentration across said second electrode, exhaust means operatively connected to the opposite ends of said gas passages and to said annulus to draw said sample gas and reference gas through said first and second gas passages at a uniform rate and to remove gases collecting within said annulus, means for heating said solid electrolyte electrochemical cell assembly, and first and second electrical leads terminated at said first and second electrodes respectively, said solid electrolyte electrochemical cell assembly generating an e.m.f. between first and second electrodes as an indication of the difference in oxygen concentration of said sample gas and said reference gas.

* * * * *